United States Patent [19]

Schumacher

[11] Patent Number: 4,592,847

[45] Date of Patent: Jun. 3, 1986

[54] PROCESS AND APPARATUS FOR CLEANING FILTER ELEMENTS, ESPECIALLY FILTER CARTRIDGES

[76] Inventor: Heinz O. Schumacher, Höperfeld 26, D-2050 Hamburg 80, Fed. Rep. of Germany

[21] Appl. No.: 707,560

[22] Filed: Mar. 4, 1985

[30] Foreign Application Priority Data

Mar. 8, 1984 [EP] European Pat. Off. ........ 84102502.6

[51] Int. Cl.$^4$ ........................ B01D 29/32; B01D 29/38
[52] U.S. Cl. .................................... 210/770; 210/771; 210/798; 210/808; 210/108; 210/323.2; 210/333.01; 210/186
[58] Field of Search ............... 210/770, 771, 772, 808, 210/798, 333.01, 332, 323.2, 806, 797, 186, 258, 108, 769

[56] References Cited

U.S. PATENT DOCUMENTS

| | | | |
|---|---|---|---|
| 2,779,477 | 1/1957 | Swensen | 210/138 |
| 2,954,872 | 10/1960 | Liddell | 210/108 |
| 3,666,097 | 5/1972 | Ryan | 210/333.01 |
| 3,891,551 | 6/1975 | Tiedemann | 210/798 |
| 4,217,700 | 8/1980 | Muller . | |
| 4,264,445 | 4/1981 | Lumikko et al. | 210/333.01 |
| 4,439,327 | 3/1984 | Muller . | |
| 4,443,346 | 4/1984 | Muller . | |

FOREIGN PATENT DOCUMENTS

| | | |
|---|---|---|
| 211329 | 10/1960 | Austria . |
| 1007294 | 5/1963 | Fed. Rep. of Germany . |
| 0070589 | 7/1982 | Fed. Rep. of Germany . |
| 0077086 | 8/1982 | Fed. Rep. of Germany . |

Primary Examiner—Benoit Castel
Assistant Examiner—Linda Evans
Attorney, Agent, or Firm—Lane & Aitken

[57] ABSTRACT

The filtering vessel (1) holding cartridge filter (16) is connected to a receiver (3) through a quick-opening valve. There is generated an underpressure in (3) for separating the filter cake built up on the cartridges, said underpressure being lower than the evaporation pressure of the liquid contained in the filter cake. Accordingly, there is built up an overpressure in the filtering vessel (1). An immediate opening of the valve (2) and a proportionate temperature in system (1) and (2) results in a spontaneous bursting off of the filter cake from the cartridge surface, which bursting off, in consequence of the pressure compensation between (1) and (3) still will be increased by means of the liquid contained in the filter cake evaporating in the course of a flash procedure. The relatively dry filter cake is collected in the receiver (3). The next filtration process can be started after closing valve (2).

12 Claims, 2 Drawing Figures

PROCESS AND APPARATUS FOR CLEANING FILTER ELEMENTS, ESPECIALLY FILTER CARTRIDGES

BACKGROUND OF THE INVENTION

INTRODUCTION

The invention relates to a process and apparatus for the fast cleaning of filter elements, especially filter cartridges, where solutions of organic matter, containing finely divided, highly dispersed suspended substances as impurities, are separated under pressure from the filter cake built up and are ready for further use in no time at all.

Solutions of this kind, e.g., are obtained while extracting fats and oils by means of organic solvents. Furthermore, such solutions are employed in many fields of organic chemistry, e.g. during the separation of mineral oil, the manufacture of paper and cellulose, the production of dyestuff, drugs, starting products of plastic material, juices, etc.

In addition to the so-called pressure leaf filters, disk filters, filter presses, etc., cartridge filters turn out to be especially successful, when the contaminating suspended substances and perhaps the auxiliary filtering material show satisfactory surface properties to allow the solution to pass over from the turbid liquid to the interior of the filter elements absorbing the pure solution as quickly as possible.

During the filtration of considerable quantities of liquids per unit of surface, cartridge filters are of special advantage as often as the solution shows a hydrophobic character and a low portion of turbid substances. The low-priced production of cartridge filters with a relatively large filtering area on a minimum space make them an indispensable aid in the engineering chemistry for that reason alone.

Cartridge filters are preferably used as pressure filters, i.e. the turbid liquid to be filtered is pressed against the (outer) surface of the filter elements, in the course of which procedure the impurities to be separated are retained on the filtering surface as a so-called filter cake, while the pure solution is drawn off from the inside of said cartridges.

Multiple cartridge filters can have a filtering area of up to 300 m$^2$ (and more) which in pressure vessels are charged with 100 bar and more.

Cartridge filters often work according to the deposit filtration principle, i.e. the turbid liquid to be filtered either moves in a circular course through the filter units over and over again until a filter bed of turbid matter has built up on the surface of said filter cartridges which then functions as filter aid, or a so-called filter aid is added to the turbid liquid to be filtered which helps to build up the filter bed on the surface of said cartridges.

Cartridge filters are a true technical aid every time the filter cake built up of filtering material and turbid substances on the surface of the cartridges can be easily removed without having to open the filter unit or even disassemble it.

However, it is known that it is typical for many substances to be separated from a turbid liquid not to fall from the filtering surface or not be separated therefrom without extreme difficulties. In many cases, the filter cake separates from the filtering surface partially or in layers only; consequently, during the following filtration cycle, either part of the filtering surface is available only, or the filtration capacity is already exhausted after the building up of a new, thin layer of cake.

The purpose of the present invention is to overcome the before-mentioned difficulties in removing the filter cake from the surface of cartridge filters completely and, in that way, to increase the capacity of cartridge filters (per unit of time).

DESCRIPTION OF THE PRIOR ART

The U.S. Pat. No. 4 217 700 already describes a process for cleaning filter cartridges, where the filter cake built up on the (outer) cartridge surface is loosened and pushed off by compressed air running in the opposite direction, i.e. from inside to outside.

The AT-A-Pat. No. 211 329 describes a system for the backwash of filter cartridges being arranged in series and mounted on collecting pipes in upright position which, at both ends, are horizontally led through the container wall of the turbid liquid vessel. This measure of leading said collecting pipes through said container wall at both ends involves maximum expenditure, the more so since, in addition to those many container bores, each collecting pipe needs to be provided with two shut-off units, for which reason there is required a great number of valves and other fittings.

The EP Pat. No. 70 589 describes a cartridge deposit filter allowing a backwash, where the filter casing is divided into at least two chambers which show vertically mounted overflow shafts being connected with each other. The backwash is carried through by means of a washing liquid being added directly below the overflow shafts through suitable connecting-pieces. The overflow shafts are made up of dividing walls; the one facing the turbid liquid flow is mounted at a certain distance from the bottom of the container and, with its upper portion, leads to the gas holder by exceeding the liquid level. The washing liquid being added through the supply shafts is led through said shafts in an upward direction together with the solids discharged by the filter elements, in the course of which procedure they, at the same time, are washed and supplied to another filtering chamber through an overflow weir. This known process also uses a washing liquid and, if necessary, compressed air running in the opposite direction. Quite apart from the fact that the washing or rinsing liquid is a considerable additional ballast for the system—since it needs to be reprocessed—the filter cake, on principle, shows a high fluid content which can amount up to 60% and more. Moreover, the discharge carried through by means of compressed air reduces the life of the cartridges.

The DE Pat. No.-C-10 07 294 suggests to increase the filtration process of the cartridge filters by means of pressure pulses being caused by pulsating movements. For this purpose, the bodies of the filter do show elastic properties towards their longitudinal axis, so that, during the backwashing procedure, there, in this direction, is produced a so-called breathing movement being influenced by quickly changing pressure causing the filter cake to loosen more easily and be discharged then. Such a process or the system being necessary for carrying through the same, however, requires substantial technical accessory units, such as bellows, elastic elements incorporated in the cartridges (helices of wire), tension springs to be used as tensioning elements, etc., which do not only complicate the assembly of the whole system, but do also considerably shorten the serviceable life of the same.

The EP Pat. No.-A-77 086 describes a process for the cleaning of cartridge deposit filters without employing any rinsing agents, where the solid cake accumulated on the cartridge surface is treated with pressure and vacuum in alternate order from within. This alternate treatment takes place through the pure liquid pipe by means of a three-way valve and results in a pulsating loosening of the filter cake on the outer surface of the filter. However, with respect to the use of the apparatus, said alternate treatment with pressure and underpressure leading to vibrations, will not be without any stability loss of the structural parts of the filter, especially of the flanges and valves as well as the filtering surface which either are loosened and, thus, become leaky or partly are considerably damaged, especially with respect to the supporting fabric or the perforation of the basic body consisting of metal, ceramics or plastic material. Besides, it hardly can be avoided that, due to the alternate treatment with pressure and vacuum taking place inside the cartridges, the perforation of the basic body gets clogged, or any solids even get into the interior (pure liquid container) of the cartridges. Moreover, a complete separation of the filter cake from the cartridge surface, in many cases, only can be made possible after having carried through said alternate treatment with pressure and underpressure at high alternating amplitudes for some considerable time.

SUMMARY OF THE INVENTION

The purpose of the invention is to integrate a filter cartridge or any system of filter cartridges into a filtration system in such a manner that, without employing any mechanically controlled elements, such as vibrators, etc., without exposing the cartridge walls to large quantities of compressed air and without any time-consuming and material-stressing alternate treatments with overpressure and underpressure, a complete separation of the solid cake from the outer surface of the cartridges will be achieved within a very short time and, at the same time, the discharged cake or cake material is in a relatively high dry condition.

Accordingly, the object of the invention relates to a process for the filtration of liquid agents containing solid impurities, where said agents (turbid liquids) together with a filtering auxiliary, if necessary, are pressed through the filtering surfaces of the cartridges and the pure solution is collected and drawn off, while the solid impurities of the turbid liquid are retained as filter cake on the outer surface of the cartridge, said filter cake being discharged by means of the liquid agent pressed through the filtering surface after having reached any nominal thickness or by depending on the pressure drop. The new process is characterized in that the turbid liquid space (container) holding the filter cartridge(s) is connected to a receiver through a quickly operating locking element, that, while keeping closed said locking element connecting said turbid liquid container with said receiver and subsequent to a parallel flow washing of the filter cake carried through, if necessary, an underpressure ($P_2$) is generated in said receiver, while there is built up an overpressure ($P_1$) in said turbid liquid container, and that a shocklike, spontaneous pressure compensation between ($P_2$) and ($P_1$) takes place in a single pass by opening the locking element connecting the turbid liquid container with the receiver, where the pressure difference $P=(P_1-P_2)$ is equal to a value between about 0.05 and 12.5 bar and the temperature in the turbid liquid container is so adjusted that, after termination of said pressure compensation, the total pressure (P) is below the evaporation point of the liquid agent (carrier liquid) building up the filter cake, too. As a result of the spontaneous and shocklike pressure release taking place between the turbid liquid container holding the filter cartridges and the receiver being separated from said turbid liquid container by means of said locking element, i.e. in consequence of the pressure compensation ($P_2$) and ($P_1$) on the total pressure (P)—after the pressure release—the filter cake suddenly is chipped off from the cartridge surface, so that, subsequently, the material of the filter cake can be collected in the receiver.

The nominal value for ($P_2$)—in the receiver—and ($P_1$)—in the turbid liquid container—of course, depends on the material the filter cake consists of and the liquid agent contained therein (carrier liquid), the evaporation parameters (pressure and temperature) of which also being decisive for the nominal values ($P_2$) or ($P_1$).

Without being able to state any precise figures now since they are part of a function of the agent contained in the filter cake, tests have shown that, before carrying through the spontaneous pressure release or pressure compensation, the difference $\Delta P=(P_1-P_2)$ amounts to about 0.05 to 12.5 bar, i.e. that in an extreme case, the receiver shows a pressure of 0.05 bar and the turbid liquid container a pressure of 12.5 bar approx.

Consequently, it is of decisive importance for the feasibility of the invention to adjust the pressure ($P_2$) in the receiver (collecting vessel for the filter cake material) to such a value which is substantially lower than the evaporation pressure of the liquid agent (carrier liquid) of the turbid liquid. This condition also needs to be maintained after the pressure compensation between the turbid liquid container and the receiver since this is the basis for the spontaneous discharge of the filter cake from the cartridge surface in combination with a so-called flash evaporation of the liquid agent (carrier liquid) contained in the filter cake, which causes the cake to be cracked and break into small particles after being burst off from the filtering surface. Subsequently, said small particles are collected in the receiver after having passed the locking element connecting the receiver with the turbid liquid container.

As mentioned already before, the spontaneous pressure compensation between ($P_2$) and ($P_1$) on said total pressure (P)—after the pressure release—takes place suddenly, i.e. the locking element (valve, slide bar, etc.) installed between the receiver and the turbid liquid container is opened suddenly, i.e. immediately. This results in a spontaneous pressure drop on the surface of the filter cake causing the evaporation of the liquid agent in the filter cake in combination with the existing temperature. The ultimate pressure after the pressure compensation, of course, is a function of the volumes of the receiver and the turbid liquid containers, too.

Surprisingly, it has shown that, while proceeding according to the suggestions made in the invention, i.e. after the pressure compensation and the involved sudden discharge of the filter cake, the surface of the filter cartridge(s) practically is completely clean, so that, after closing of the locking element connecting the receiver with the turbid liquid container, the filter unit can be used for the next filtration process without delay.

Furthermore, the invention relates to an apparatus for carrying through the process for the cleaning of filter elements, especially filter cartridges, which had been described before.

DESCRIPTION OF THE PREFERRED EMBODIMENTS

Figure 1:
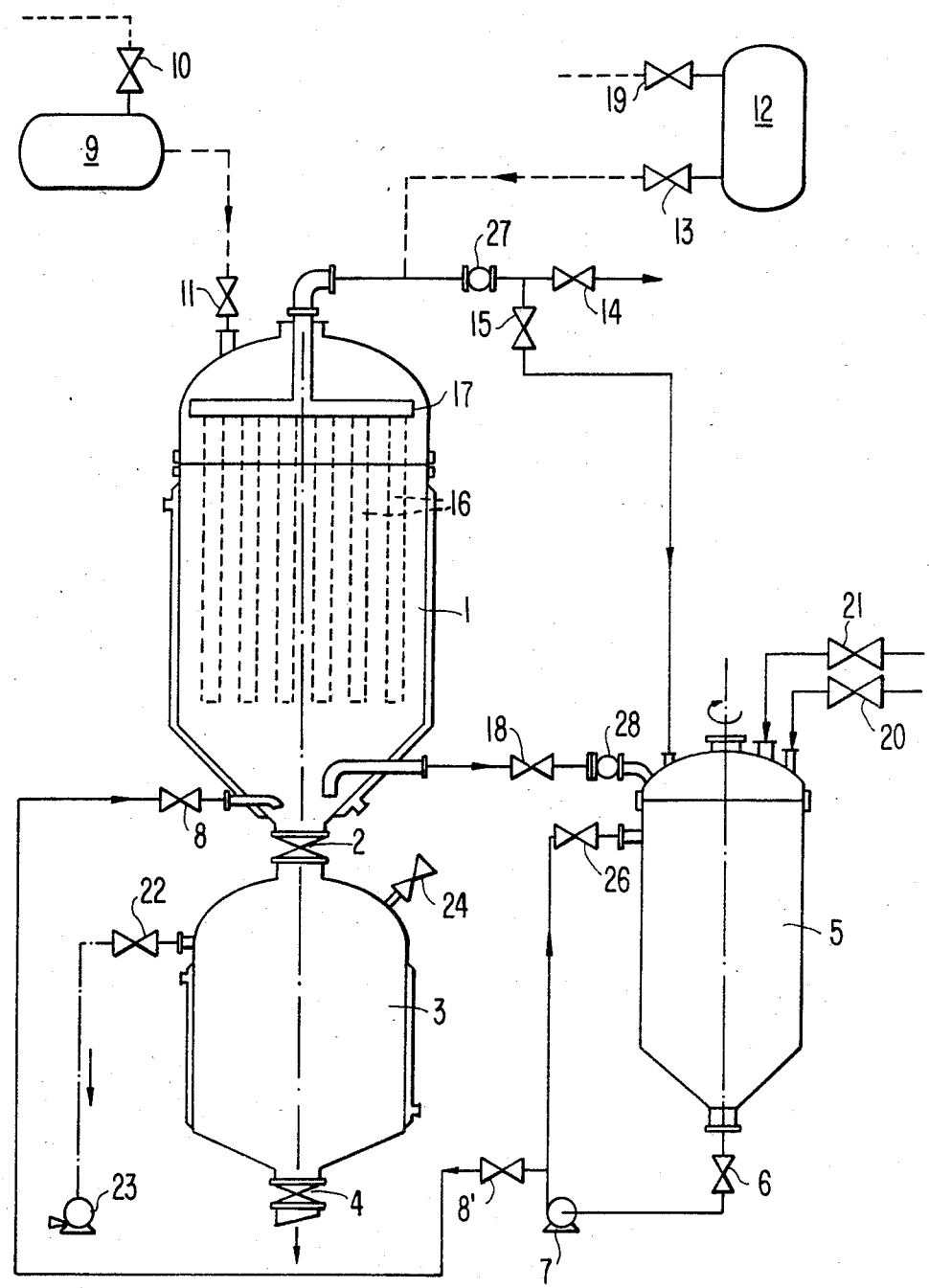
FIG. 1 is a schematic diagram depicting the apparatus and process of the present invention.

The main feature of the apparatus according to the invention is the actual filtering vessel (turbid liquid container) (1) together with the receiver (3) being connacted to the filtering vessel by means of a quick-action locking element (2), said receiver (3) absorbing the filter cake when being burst off from the filtering surface after termination of the pressure compensation.

During operation of said apparatus, the turbid liquid to be filtered first is supplied to a mixing receiver (5) through pipe or valve (20), where, if necessary, it is mixed with a filtering auxiliary through pipe (21). Pump (7) is put into operation with opened valved (6, 26) and closed valve (8') for making the turbid liquid or suspension of turbid liquid and filtering auxiliary circulate in (5) for the purpose of homogenization. The mixing receiver, if necessary, is provided with a stirring unit.

As soon as there is reached a sufficient homogeneity in (5), valve (26) is closed, while valve (8') is opened, and the suspension of turbid liquid and filtering auxiliary is pressed from (5) through (8', 8) into the turbid liquid container (1)—called filtering vessel hereinafter—by means of the pump pressure of (7) with closed valves (2, 18, 11, 13, 14) and opened valve (15). Thereafter, the turbid liquid passes the filter elements (16) under the existing pump pressure, in the course of which procedure there is built up a filter cake on the outer surface of the filter elements (16).

The pure filtrate is led back to the mixing receiver (5) through a collecting pipe (17) and valve (15). The circulation of the turbid liquid or of the filtrate is continued until there is shown in the sight-glass (27) a pure filtrate being absolutely free of solids.

The deposit procedure is finished now.

While valves (2, 4, 24) are kept closed, a vacuum pump or another system (23) generating underpressure, such as a vapour diffusion pump, etc., is set into action for evacuating the receiver (3) to e.g. 0.05 bar with opened valve (22). This pressure serves as an example only and—as already stated at the beginning—is to be regarded as a function of various factors, such as the distillation characteristics of the liquid contained in the filter cake, the effective pressure in the filtering vessel (1), the volume of vessel (1) and the receiver (3), etc.

Valve (22) will be closed and the system (23) shut off when having reached the necessary underpressure.

As soon as the cake on the filter cartridges (16) has reached a certain operational thickness or there, for any other reasons, will be noticed a decrease of the filtration efficiency (loss of capacity), the cartridges need to be cleaned or the cake built up on the cartridge surfaces to be separated.

For this purpose, a compressed gas container (9), first of all, is filled with a suitable compressed gas (compressed air, inert gas, water vapour, etc.) through valve (10). This procedure does not need to be carried through, if there are available any operative pipes for this type of gas. Valve (8) is closed while valves (26, 18, 11) are opened. In this way, the residual turbid liquid or filtrate still contained in the filtering vessel (1) will be reevacuated into the mixing vessel (5). The end of this reevacuation process will be shown in the sight-glass (28). Valves (18) and (15) are closed now, and an overpressure of e.g. 3 bar absolute is built up in the system (1, 16, 17, 12) via the gas container (9), while valves (19) and (11) are closed, too. The filtering vessel (1) usefully had been emptied before—using water as carrier liquid or liquid agent—by means of water vapour through valves (10, 11) and container (9), causing the residual turbid liquid to flow back into the mixing vessel (5) through valve (18) and sight-glass (28). The pressure build-up in (1, 16, 17, 12) also may be carried through by means of water vapour in (9) or through (10, 9, 11). Said underpressure of 0.05 bar in the receiver (3) and 3 bar absolute in (1), for instance, does not require a temperature being higher than 35° C. approx. for achieving a spontaneous pressure release between the filtering vessel (1) and the receiver (3).

EXAMPLE

A filtering vessel (1) having a volume of 1m$^3$ and a receiver (3) having a volume of 3 m$^3$ are used for the filtration of an aqueous turbid liquid of organic matter, especially of industrial waste water. The residual air in the receiver (3) was replaced by water vapour through valve (24) and, at the same time, the pressure in (3) was reduced to 0.05 bar. This means that the atmosphere of said receiver (3) does consist of pure water vapour now (valves 2 and 4 are closed, of course). After also emptying container (1) by means of water vapour through (10, 9, 11)—turbid liquid being delivered to the mixing vessel (5) through valve (18)—an overpressure of 3 bar absolute is adjusted in the filtering vessel (1), so that the filtering vessel (1) contains about 1.65 kg of water vapour, while the receiver (3) contains about 100 g of water vapour only. After opening the locking element (2) for carrying through the pressure compensation between (1) and (3), the total system having a volume of about 4 m$^3$ contains about 1.750 kg of water vapour or 0.44 kg of water vapour per cubic meter (any residual air can be disregarded now). Reciprocally, a value of 0.44 kg of water vapour per cubic meter (compensation volume) is equal to about 2.27 m$^3$ per kilogram of water vapour. This corresponds to a reduced pressure of about 0.95 bar absolute. The difference in the saturated vapour temperature between 3 bar absolute (measured in the filtering vessel before the pressure release) and 0.95 bar absolute (measured in the system (1, 2, 3) after the pressure release) amounts to 35° C. approx., which are available for the so-called flash-evaporation of the water in the filter cake. Under these conditions, said filter cake is chipping off spontaneously, the water is evaporating and the cake material is collected in the receiver (3) in a relatively dry condition.

Consequently, according to the process described by the invention, there, especially, are two facts allowing the quick separation of the filter cake. On the one hand, there is concerned the flash-evaporation of the liquid contained in the filter cake for tearing open the cake or entraining parts thereof and, on the other hand, there is concerned the spontaneous pressure compensation or pressure release from the inside of the filter cartridges through the filter cake towards the filtering vessel or receiver since, during said spontaneous pressure compensation between (1) and (3), the filter cartridges (16), the collecting pipe (17) and, if necessary, the container (12) are integrated in this process. The separation of the cake built up on the cartridges (16) is carried through with utmost speed, so that the cake material is bursting off immediately. At the same time, due to the evaporation of the carrier liquid or residual moisture contained in the cake material, there takes place a drying process.

After termination of the pressure compensation between the system (1, 16, 17, 12) on the one hand and the receiver (3) on the other hand, the relatively dry filter cake material is collected in the receiver (3), where it can be drawn off from through valve (4).

In the meantime, the next filtration process can be started.

In the course of this filtration process, the vessel or receiver (3) is prepared again by first carrying through a ventilation by means of valve (24). The cake or cake material collected in (3) is discharged, for which procedure, if necessary, a washing—not shown—of the receiver (3)—rinsing, etc.—may be useful. After closing of the valves (2, 24, 4) the receiver too is prepared for the next procedure.

The before-described working method of the process according to the invention is shown in FIG. 1 in regard to its general structural elements and apparatus components only. Especially, said process proved to be useful for such filtration processes, the turbid substances of which are of very fine-grained and viscous nature and, after building up of the cake, do stick to the filtering surface relatively permanent and compact. One example for this, among others, is the filtration of miscella of the oil and fat extraction of seed, such as soja, rape, sunflowers, etc., consisting of about 25% of fatty acids or oils and about 75% of extracting agents or solvents, such as petrol, hexane, etc. The nature of the turbid substances makes the clear filtration of such miscella especially difficult, though the content of turbid substances is relatively low. The high content of slime and the small particle size result in a muddy filter cake which, in many cases, only can be optimally removed by dismounting the cartridges after termination of each filtration process or by using any mechanical cleaning elements. In those cases, the process according to the invention proves to be particularly useful, since there not only is got a clear miscella—because, as a result of the measures described by the invention, the surface of the cartridges, after the cleaning procedure, does not show any residues of the filter cake any more—but——and this only can be realized by following the measures described by the invention—there also does take place a complete discharge of the filter cake having reached a thickness of 3-8 mm as well as an optimum drying process of the cake material which is carried through simultaneously by means of pressure release.

Thus, the use of high-pressure air, vibration elements, mechanical cleaning instruments or even the necessity of dismounting the cartridges for cleaning purposes is eliminated.

During the filtration of the before-defined miscella of the oil extraction by means of organic solvents, the filter cake built up on the surface of the filter cartridges, in general, still shows a liquid content of about 50% (miscella) being a mixture of fatty acids or oils and solvents. The rest of the cake does consist of turbid substances and filtering auxiliary.

Figure 2:
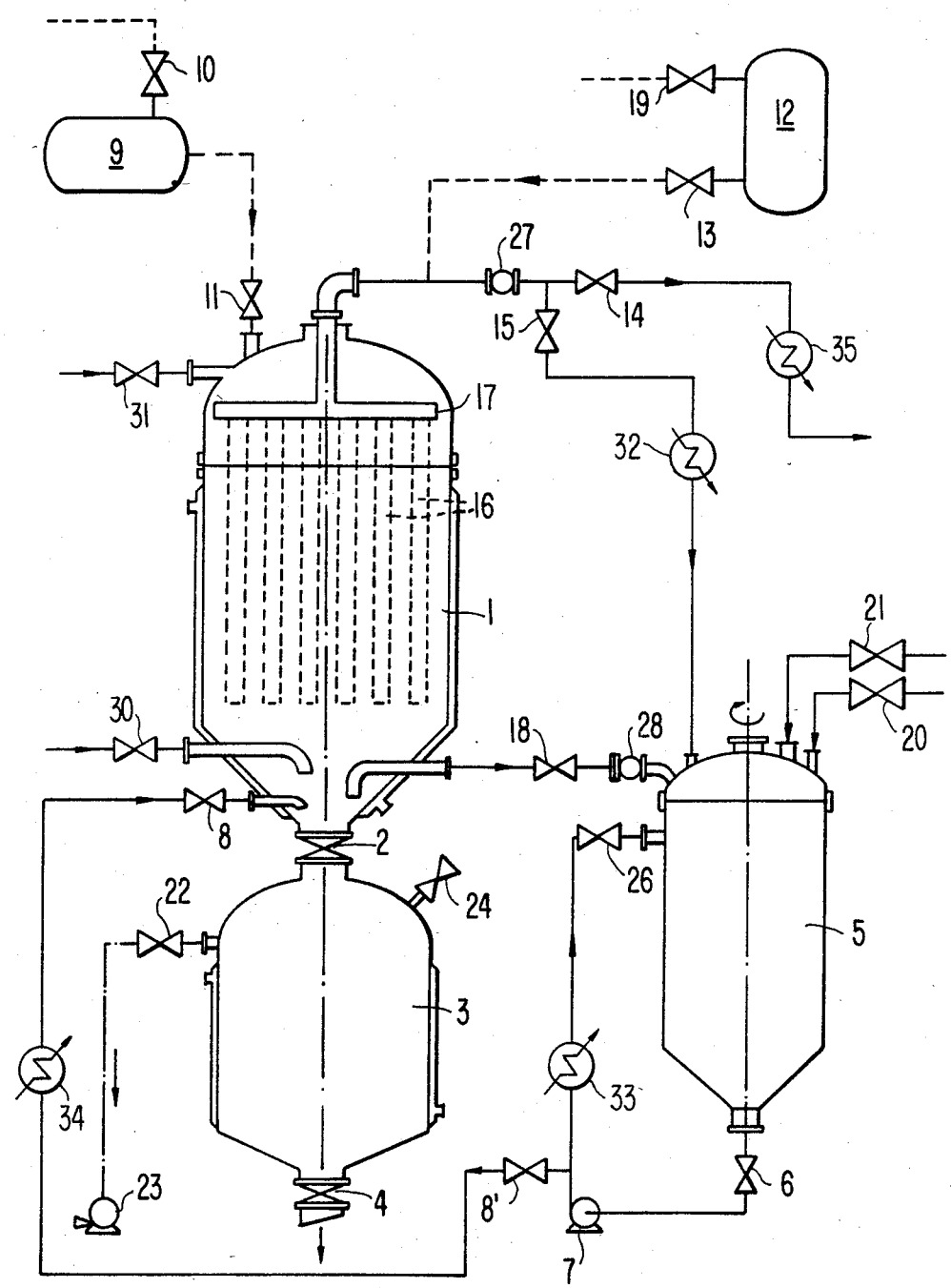
FIG. 2 shows a further development of the same which, especially, proved to be effective for such turbid liquids, the carrier liquid (liquid agent) of which does consist of a low-boiling organic solvent, such as low hydrocarbons, alcohols, etc.

To be able to, in this case, optimally recover the valuable oil—and the solvent—a process has proved to be useful which is more detailedly described by FIG. 2.

There, at first, a new solvent (a solvent being equal to the solvent of the miscella to be filtered and contained in the filter cake, too) is pressed into the filtering vessel (1) through the opened valve (30) with closed valves (2) and (18) for washing the cake on the cartridge filters (16)—after termination of the miscella filtration or after building up of the filter cake—by means of said new solvent, such as hexane to, in this way, get a certain quantity of the oil contained in the filter cake extracted therefrom.

The additional solvent added through (30) including the oil extracted from the filter cake by means of this solvent either is used for the separation of the miscella, for which purpose it is delivered through the collecting pipe (17) and valves (14, 15), or it is collected in the mixing vessel (5).

Furthermore, in the special case of the miscella filtration, it is advisable to evaporate the filter cake by means of water vapour before carrying through the separation; for this purpose, water vapour is delivered to the filtering vessel, e.g. via pipe or valve (31). This measure helps to expel a substantial part of the solvent (e.g. hexane) contained in the filter cake built up on the cartridges (16) and to recover it in one of the condensers (32,35) after termination of the condensation procedure. For this purpose, depending on the principle of process, the solvent/water condensate (and oil, if necessary) is collected as such via condenser (34) or via condenser (32) for adding it to the filtration mixture in (5).

As FIG. 2 shows, too, it is advantageous to equip the circuit (5, 6, 7, 26) as well as the charging pipe (5,6,7,8',8) with one heat exchanger (33, 34) each for reaching, during the subsequent pressure release between the filtering vessel (1) and the receiver (3) via the quick-action locking element (2), a temperature drop being sufficient for the evaporation of the liquid agent contained in the filter cake.

So, when taking a miscella temperature of 70° C. as a basis —from the mixing container (5) through pump (7) and exchanger (34) —the evaporation temperature of hexane as a solvent—and liquid in the filter cake—is not higher than 55° C. at about 0.4–0.6 bar. This means that, if there is concerned a filter cake having a temperature of about 70° C., a pressure release (from (1) through (2) to (3)) to 0.4–0.6 bar (compensation pressure) results in an immediate and spontaneous evaporation of the hexane being expelled from the cake and, consequently, leads to a sudden bursting off of the cake from the cartridge surface.

It goes without saying that the whole process of filtration and separation of the filter cake can be adjusted and controlled fully automatically when using a suitable automatic mechanism which is obligatory for a modern process technology. Though it is not necessary to state any details, it should be mentioned that there does exist a system, where the valves (2, 4) are constructed as quick, high-vacuum slide valves, as valve flaps, as ball valves, etc., the working phases (opening and closing) of which can be terminated within fractions of seconds for reaching the effect of the necessary spontaneity of the pressure compensation between (1) and (3).

Besides, the optimum duration of filtration can be subjected to a control diagram by means of the rise of the pump pressure in (7), so that the whole process will be controlled by a working diagram with respect to time.

During the separation of the filter cake built up on the cartridges (16), the overpressure building up in the system (1, 16, 17, 12) can be regulated additionally by means of inert gas or steam via (19) and pressure vessel (12). The sight-glasses (27, 28), of course, can be replaced by any known instruments, for instance any optical equipments for measuring the turbid liquid.

In general, the complete process of filtration, separation of the filter cake by pressure release or pressure compensation between filtering vessel (1) and receiver (3) as well as a new filtration can be carried through fully automatically.

I claim:

1. Process for cleaning filter cartridges after filtration of solutions containing solid impurities in organic, polar and non-polar solvents, wherein at least a solution is added through filter cartridges, and pure solution, after passing the filter cartridges, is collected and drawn off, while the solid impurities are retained on the outer surface of the filter cartridges by building up a filter cake which, after reaching a nominal thickness or by depending on a pressure drop in a supply pipe to the filter cartridges, is discharged from the same, comprising the steps of:
    connecting a container holding the filter cartridges to a receiver through a quickly operating locking element;
    generating an underpressure ($P_2$) in said receiver with the locking element being closed, while at the same time building up an overpressure ($P_1$) in the container holding the filter cartridges;
    causing a spontaneous pressure release between ($P_1$) and ($P_2$) to take place in a single pass by opening the locking element connecting the receiver with the container of the filter cartridges, with a pressure difference $\Delta P = (P_1 - P_2)$ equal to a value between about 0.05 and 12.5 bar;
    adjusting temperature in the container so that, in consequence of the combination with spontaneous pressure release, liquid contained in the filter cake is evaporated, thereby causing the filter cake to burst off from the cartridge surface; and
    collecting the filter cake in the receiver.

2. Process according to claim 1, wherein the pressure ($P_2$) is adjusted to a value which is substantially lower than the evaporation pressure of the liquid contained in the filter cake.

3. Process according to one of claims 1 or 2, wherein, after termination of the pressure release, the resulting pressure is substantially lower than the evaporation pressure of the liquid contained in the filter cake.

4. Process according to claim 1, wherein, at the moment of the spontaneous pressure release between ($P_1$) and ($P_2$), the temperature of the liquid contained in the filter cake is adjusted to a value which is higher than the evaporation temperature of the liquid contained in the filter cake.

5. Process according to claim 4, wherein, prior to pressure release, the filter cake built up on the cartridges is washed by means of a solvent.

6. The process according to claim 5, wherein said solvent is also part of said filter cake.

7. Process according to claim 5, wherein, prior to the pressure release, the filter cake is dried by means of a gas.

8. The process according to claim 7, wherein said gas is water vapor.

9. The process according to claim 1, wherein a filtering auxiliary is combined with said solution before it is added through said filter cartridges.

10. Process for cleaning filter cartridges after filtration of miscella, being a residue of an oil extraction and containing turbid substances, wherein at least a solution is added through filter cartridges, and pure solution, after passing the filter cartridges, is collected and drawn off, while solid impurities are retained on the outer surface of the filter cartridges by building up a filter cake which, after reaching a nominal thickness or by depending on a pressure drop in a supply pipe to the filter cartridges, is discharged from the same, comprising the steps of:
    connecting a container holding the filter cartridges to a receiver through a quickly operating locking element;
    generating an underpressure ($P_2$) in said receiver with the locking element being closed, while at the same time building up an over pressure ($P_1$) in the container holding the filter cartridges;
    causing a spontaneous pressure release between ($P_1$) and ($P_2$) to take place in a single pass by opening the locking element connecting the receiver with the container of the filter cartridges, with a pressure difference $\Delta P = (P_1 - P_2)$ equal to a value between about 0.05 and 12.5 bar;
    adjusting temperature in the container so that, in consequence of the combination with spontaneous pressure release, liquid contained in the filter cake is evaporated, thereby causing the filter cake to burst off from the cartridge surface; and
    collecting the filter cake in the receiver.

11. Apparatus for carrying through a process for cleaning filter cartridges after filtration of solutions containing solid impurities in organic, polar and non-polar solvents, wherein at least a solution is added through filter cartridges, and pure solution, after passing the filter cartridges, is collected and drawn off, while the solid impurities are retained on the outer surface of the filter cartridges by building up a filter cake which, after reaching a nominal thickness or by depending on a pressure drop in a supply pipe to the filter cartridges, is discharged from the same, said apparatus comprising:
    a container comprising filter cartridges;
    a receiver;
    a quickly operating locking element;
    a means for connecting said container to said receiver through said quickly operating locking element;
    a means for generating an underpressure in said receiver;
    a means for building up an overpressure in said container, said underpressure and said overpressure being created simultaneously and when said locking element is closed;
    a means for causing a spontaneous pressure release between said overpressure and said underpressure to take place in a single pass by opening said locking element connecting said receiver with said container, with a pressure difference $\Delta P = (P_1 - P_2)$ equal to a value between about 0.05 and 12.5 bar;
    a means for adjusting temperature in said container so that, in consequence of the combination with spontaneous pressure release, liquid contained in said filter cake is evaporated, thereby causing said cake to burst off from said cartridge surface; and
    a means for collecting said cake in said receiver.

12. The apparatus according to claim 11, wherein said container and said receiver comprise heating means, wherein said container comprises discharge pipes for said filtrate, said discharge pipes each comprising a condenser, and wherein said apparatus further comprises a mixing vessel for receiving turbid liquid to be filtered, mixing at least said turbid liquid and delivering at least said turbid liquid to said container, said mixing vessel being provided with a recirculation pipe for recirculating at least said turbid liquid to said mixing vessel, said apparatus further comprising a heat exchanger in said recirculation pipe and a heat exchanger in a pipe for delivering at least said turbid liquid from said mixing vessel to said receiver.

\* \* \* \* \*